Aug. 30, 1955  J. LONG  2,716,471
COMBINED COUPLER AND BRAKE APPLYING DEVICE
Filed Jan. 5, 1949  2 Sheets-Sheet 1
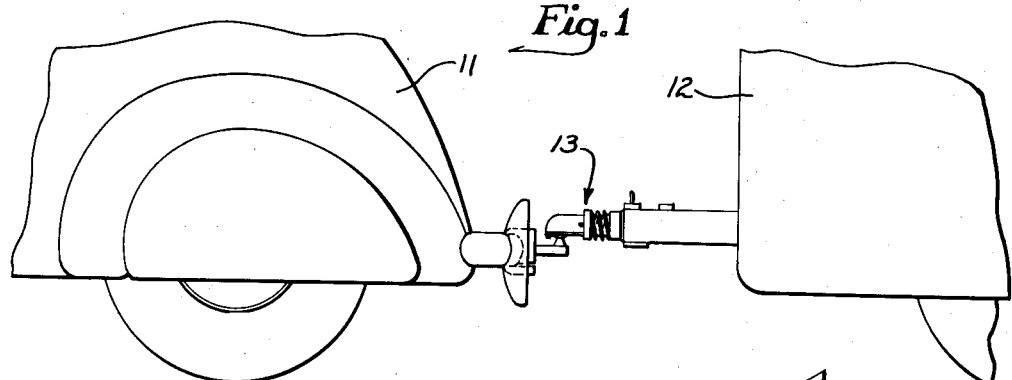
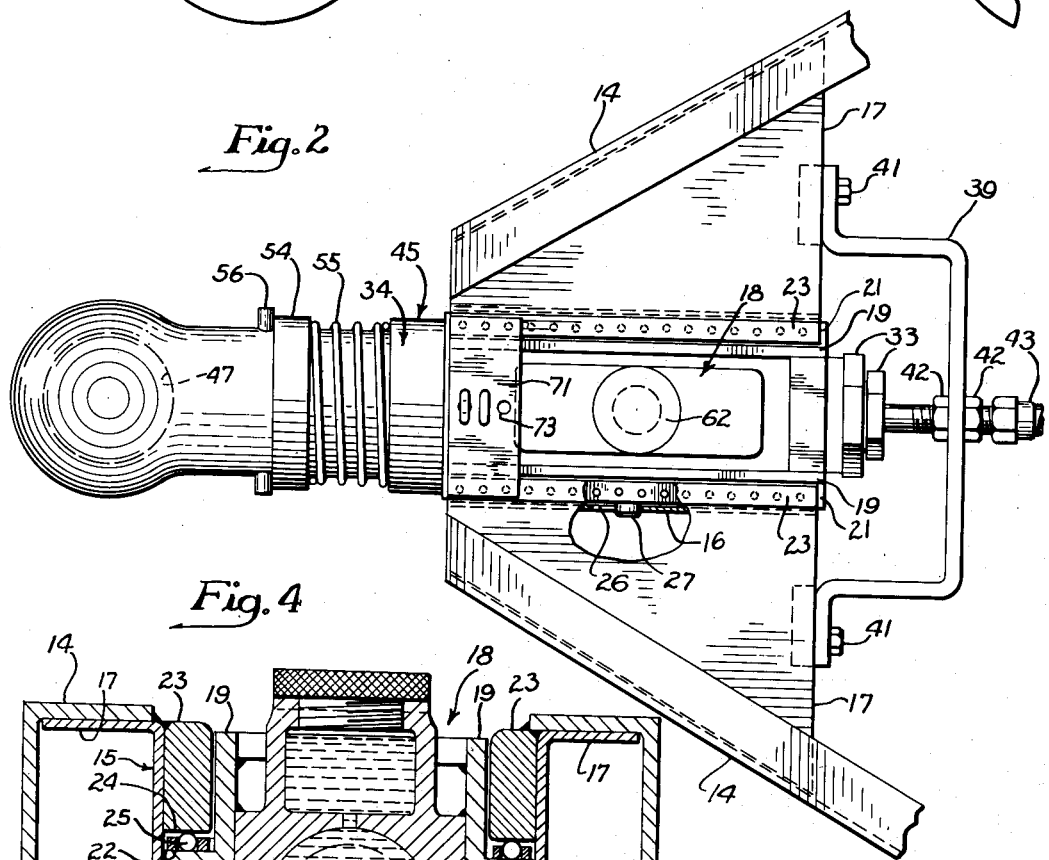
INVENTOR.
Jesse Long
BY
Atty.

Aug. 30, 1955 J. LONG 2,716,471
COMBINED COUPLER AND BRAKE APPLYING DEVICE
Filed Jan. 5, 1949 2 Sheets-Sheet 2
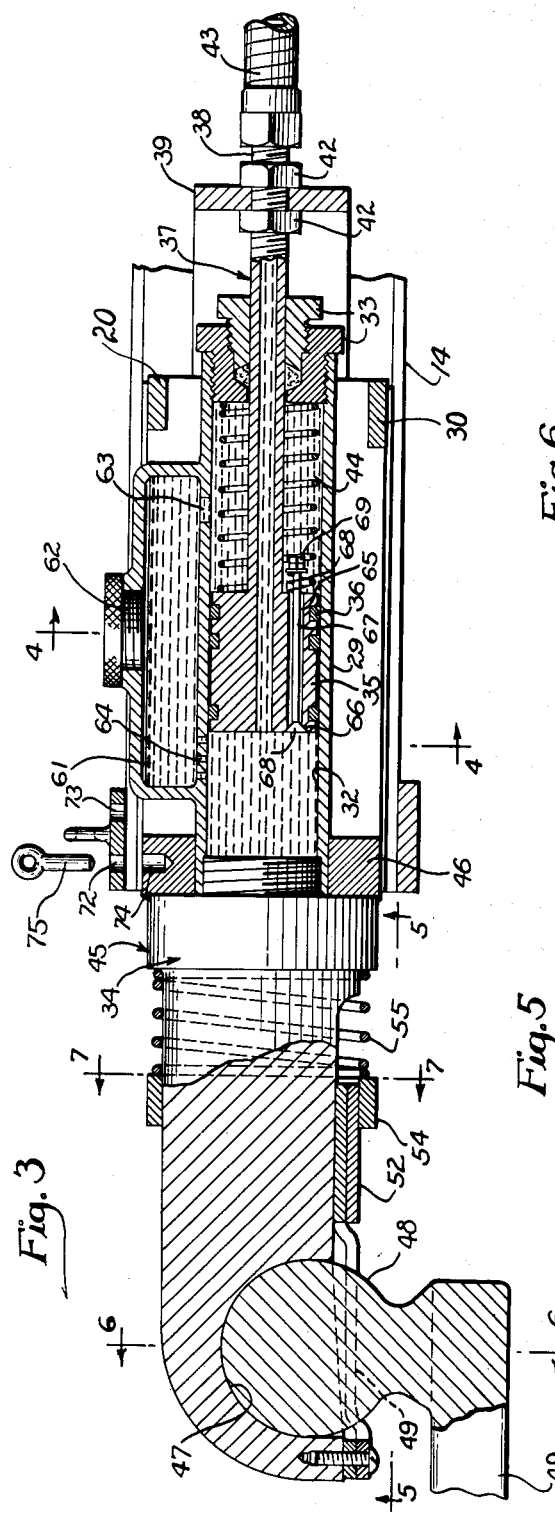
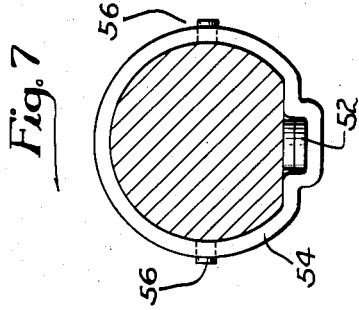
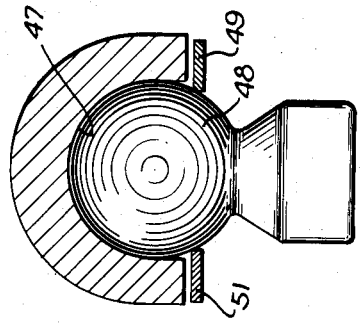
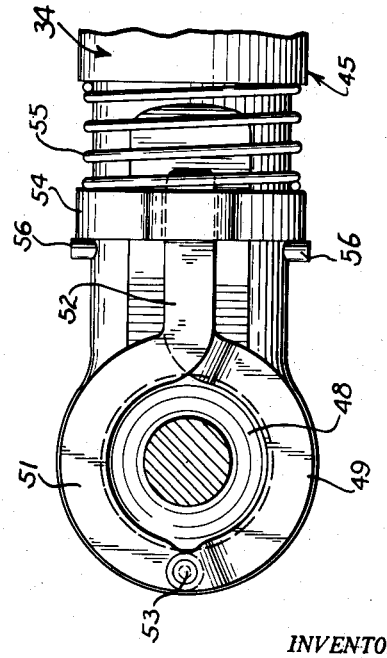
INVENTOR.
Jesse Long
BY
Atty.

United States Patent Office 2,716,471
Patented Aug. 30, 1955

2,716,471

COMBINED COUPLER AND BRAKE APPLYING DEVICE

Jesse Long, Chicago, Ill.

Application January 5, 1949, Serial No. 69,266

10 Claims. (Cl. 188—112)

The invention relates to improvements in hydraulic brake controls for trailer vehicles and is more particularly concerned with a rugged combined coupler and brake-applying device of a kind that operates automatically to apply the brakes of the trailing vehicle when the trailing vehicle tends to overrun the lead vehicle.

Coupler and brake-applying devices of the kind disclosed herein are carried by the trailing vehicle and include a draw bar provided on its end with a coupling socket adapted to receive in detachable locking engagement therein a coupling ball carried by the lead vehicle. Known devices of this general character lack means to effect gradual or progressive application of the trailer brakes corresponding to the rate of overrun and, further, lack means to insure immediate and complete brake release the instant the lead vehicle overcomes the overrun. It is therefore an object of the present invention to provide a brake-applying device of the character described with novel means to overcome the aforementioned objectionable feature of known prior devices.

Another object of the present invention is to provide a combined coupler and brake-applying device which automatically sets the brake of a trailing vehicle when the latter is uncoupled from the lead vehicle.

Another object is to provide a coupler and brake-applying device with novel means to detachedly secure the coupler parts together.

Another object is to provide a device of the character referred to which is ruggedly constructed, not expensive to manufacture, durable, fool-proof and highly efficient in operation and use.

Other and further objects of the present invention will be apparent from the following description and claims and are illustrated in the accompanying drawings, which by way of illustration show a preferred embodiment and the principle thereof and which is considered to be the best mode contemplated for applying that principle. Other embodiments of the invention may be made as desired by those skilled in the art without departing from the present invention and the purview of the appended claims.

In the drawings:

Fig. 1 is a side elevational view of the coupler and brake-applying device embodying features of the present invention and shown associated with a lead vehicle and trailing vehicle.

Fig. 2 is a top plan view of the device.

Fig. 3 is a longitudinal vertical sectional detail view of the device, showing parts in elevation.

Fig. 4 is a vertical transverse sectional view, taken substantially on line 4—4 of Fig. 3.

Fig. 5 is a bottom plan view of the draw bar and hitch element, taken substantially along line 5—5 of Fig. 3.

Fig. 6 is a vertical sectional view, taken on line 6—6 of Fig. 3.

Fig. 7 is a sectional detail view, taken on line 7—7 of Fig. 3.

Referring to the accompanying drawing, Fig. 1 illustrates a lead vehicle 11 and a trailer vehicle 12 coupled together by a combined coupler and brake-applying device, generally indicated at 13, embodying the features of the present invention. The trailer vehicle is of a kind having hydraulic brakes associated with one or more of its wheels, which brakes are adapted to be set either partially or firmly each time the trailer vehicle overruns the lead vehicle. Such automatic setting of the trailer vehicle brakes prevents jack-knifing of the vehicles.

In the present disclosure the trailer vehicle 12 is provided with forwardly extending channels 14 which may constitute a part of the chassis thereof or may be suitably attached thereto. The channels 14 extend beyond the front end of the trailer vehicle and preferably are arranged angularly one relative to the other in the manner best illustrated in Fig. 2. The projecting ends of the channels 14 are each provided with face plates 15 fabricated from sheet stock of sufficient gauge to be permanently shaped so as to define vertical wall portions 16 having outwardly extending flanges 17 on their upper and lower edges. The flanges 17 are substantially triangular in outline so as to conform substantially to the angular disposition of the channels 14 and said flanges 17 are disposed against the inside faces of the upper and lower walls of said channels in the manner illustrated. The flanges 17 and channel walls are secured together permanently, as by welding.

Upon again referring to Fig. 2 it will be observed that the walls 16 of the members 15 are parallel and are spaced apart to receive between them the brake-control mechanism generally indicated at 18. Such brake-control mechanism includes a pair of vertically disposed parallel plates 19 having a width corresponding substantially to the depth of the walls 16. Each plate 19 has an integral bar-like enlargement 21 substantially co-extensive with its length and located midway between the upper and lower edges of the plate 19. The bar-like enlargements 21 are disposed on the outside faces of the plates 19 and each has its upper and lower horizontal faces 22 suitably ground to provide smooth bearing surfaces for purposes to be made apparent presently. The outside faces of the walls 16 also are provided with bar-like elements 23, one spaced above and the other spaced below the bar-like enlargement 21. The elements 23 are firmly secured to the walls 16 preferably by means of welding. Suitable clearance is provided between the ground faces 22 of the bar-like enlargements 21 and the opposed faces 24 of the bar-like elements 23. Anti-friction bearings, generally indicated at 25, are arranged in the said spaces to afford non-friction means for facilitating free, unimpeded longitudinal sliding of the plates 19 relative to the plates 16 within predetermined limits.

The amount of relative sliding of the plates 19 with respect to the plates 16 is determined by the length of slots 26 in the walls 16 through which stop pins 27 carried by the bar-like enlargements 21 project. These stop pins are of sufficient diameter as to carry the heavy loads imparted thereto during operation of the brake-control mechanism to be described.

The slide plates 19 are adapted to be joined together and to a brake-control mechanism generally indicated at 28. As best illustrated in Figs. 2 and 3 the brake-control mechanism 28 is embodied in an elongated block-like housing 29 which is substantially square in cross-section and has its opposite side walls in firm abutment with the opposed faces of the plates 19. The housing 29 may be secured to the plates 19 as by welding at 31 and, if desired, straps 20 and 30 may connect the rear ends of the plates 19. This affords a substantially integral structure whereby the housing 29 moves in unison with the plates 19 during operation of the brake mechanism.

The brake-control mechanism is best illustrated in Fig. 3. As there shown the housing 29 is provided with a longitudinal cylindrical bore 32 suitably closed at one end as by means of a packing gland assembly 33 and at its other end by a draw bar 34 which is firmly secured to the housing and plate assembly in a manner to be described presently. A piston 35 is mounted for longitudinal reciprocation within the bore 32. As shown, this piston is provided with the customary piston rings 36 and has a tubular piston rod 37 projecting from one face thereof and extending through the packing gland assembly 33. The projecting end of the tubular piston rod 37 preferably is externally threaded at 38 and extends through a substantially U-shaped horizontally disposed bracket 39 mounted at 41 to the adjacent ends of the members 15 of the plate assembly. Nuts 42 threaded onto the projecting end of the tubular piston rod 37 firmly secure said rod to the bracket 39 and thereby prevent relative longitudinal shifting of said rod and its piston. The tubular piston rod 37 is connected at its projecting end with the usual flexible hose or conduit 43 leading to the brake cylinders of conventional brake mechanism associated with one or more of the trailer vehicle wheels. A spring 44 arranged within the bore 32 and tensioned between the packing gland assembly 33 and one end of the piston 35 normally tends to urge the housing 29 in the direction of the bracket 39.

The draw bar 34 may be provided with a flange-like enlargement 45 at one end in abutment with the housing 29. This flange-like enlargement is of a diameter considerably greater than the over-all dimension of the housing 19. Consequently, a mounting block 46 is fitted over the adjacent end of the housing 29 and has its vertically disposed side edges in abutment with the opposed faces of the mounting plates 19 and welded thereto. The flange 45 is welded to the mounting block 46. This structure affords means whereby any load carried by the draw bar 34 is transmitted through the mounting block 46 to the plates 19, thus relieving the housing 29 of any direct stress in a longitudinal direction.

The other end of the draw bar 34 is provided on its bottom face with a substantially semi-spherical socket 47 adapted to receive a ball 48 on a complemental coupling element 49 firmly secured in any conventional manner to the lead vehicle 11. When the two vehicles are connected in a train, the ball 48 is retained in the socket 47. Retention of the ball is of greatest importance during operation of the vehicles and accordingly novel means is provided to prevent inadvertent separation of the parts.

To this end a pair of clamps 51 is provided on the under face of the draw bar 34. These clamps each have a substantially semi-circular portion adapted to embrace one side of the ball 48 below its greatest diameter and a straight tongue-like portion 52 extending substantially parallel to the draw bar when the clamps are in ball-engaging position. The free ends of the semi-circular portions of said clamps are pivotally secured to the draw bar as by means of a pintle pin 53. It should be quite evident at this time that the clamps 51 may be moved into ball-engaging and ball-disengaging position to thereby afford quick positive means for attaching or separating the trailing vehicle from the lead vehicle.

When the clamps are in ball-engaging position their projecting straight end portions 52 are in substantially overlapping position. Means is provided in the form of a slide ring 54 to prevent movement of the clamps into ball-disengaged position. As best illustrated in Figs. 5 and 7 the ring 54 normally is urged into clamp-engaging position by a spring 55 interposed between said ring and the flange 45 of the draw bar. A pair of pins 56 carried by the draw bar 34 and preferably arranged in diametrically opposed position affords means to limit movement of the ring 54 over the clamp ends 52.

From the foregoing it should be evident that when a pull is exerted upon the draw bar 34, the housing and plate assembly 29—19 is drawn forwardly so as to impart a relative movement to the piston 35 against the action of the spring 44. When forward pull is diminished or stopped the spring 44 reacts to draw the housing assembly rearwardly relative to the piston 35. It is this action which is effective to operate the brakes of the trailing vehicle.

Upon again referring to Fig. 3 it will be observed that the housing 29 is provided, preferably on its top, with a fluid reservoir 61 having a filling opening normally closed by a cap 62. The reservoir 61 is in communication with the cylindrical bore 32 rearwardly of the piston 35. The ports 64 open into the cylindrical bore 32 forwardly of the piston 35 when the latter is in the position illustrated in Fig. 3. Accordingly, both ends of the cylindrical bore 32 are filled with fluid. When the draw bar 34 is pulled forwardly, as when the lead vehicle is pulling the trailing vehicle, liquid contained within the rear end of the cylindrical bore 32 flows freely under normal pressures through the opening 63 into the reservoir 61. The displaced liquid in the reservoir flows through the ports 64 into the forward end of the cylindrical bore 32, thus relieving the brakes of the trailing vehicle of any effective pressures.

Any movement rearwardly of the draw bar 34 and likewise of the housing 29 relative to the piston 35 will immediately increase the pressure under which the fluid in the forward end of the cylindrical bore 32 is maintained. Such increase in pressure is due to the restriction offered to the flow of fluid from the forward end of the cylindrical bore 32 back into the reservoir 61 through restriction ports 64. As a result of this increase pressure the brakes of the trailer vehicle are proportionately actuated to retard free wheeling of the trailer vehicle. When the lead vehicle comes to a complete stop, the spring 44 operates to pull the draw bar 34 and housing 29 rearwardly to the maximum limits of its rearward movement. Such movement of the housing 29 locates the forward end of the piston 35 forwardly of the ports 64. Accordingly the pressure exerted upon the liquid in the forward end of the cylindrical bore 32 is progressively stepped up as the ports 64 are successively closed by the advancing piston 35. This insures a gradual and even application of the trailer vehicle brakes from non-braking position to complete braking.

When the lead vehicle is again put in motion the draw bar 34 and housing 29 are again drawn in a forwardly direction against the action of spring 44. However, initial forward movement of the draw bar 34 is insufficient to effect immediate release of the pressure on the liquid in the forward end of the cylindrical bore 32. Consequently, any initial forward movement of the lead vehicle would be against the retarding action of the set brakes. Accordingly, novel means is provided in the piston 35 to effect immediate relief of the pressure on the brake actuating liquid upon initial forward motion of the lead vehicle.

Still referring to Fig. 3 it will be observed that the piston 35 is provided with a longitudinal bore 65 suitably provided, on the forward end of the piston, with a valve seat 66. A valve stem 67, having a valve element 68 adapted to co-mate with the valve seat 66, extends through the bore 65 and carries on its rearwardly projecting end a spring 69 normally tensioned by nuts firmly secured to the end of said valve stem. The spring 69 normally holds the valve in closed position. However, when the housing 29 is moved forwardly, the valve element 68 is momentarily unseated from the valve seat 66, thus permitting the trapped fluid in the forward end of the cylindrical bore 32 to flow freely through the bore 65 into the other end of the cylindrical bore 32, thereby relieving all pressure on the trailing vehicle brakes.

The instant coupler and brake control mechanism is provided with mechanical means to lock the brakes or to prevent locking of said brakes under various conditions of use. As shown in Figs. 2 and 3, such means includes a substantially horizontal plate 71 firmly secured at its ends, as by welding, to the top flanges of the face plates 15, which plate 71 is provided with a pair of transversely spaced-apart holes 72 and 73. When the brake mechanism is in the position illustrated in Fig. 3, the hole 73 is in vertical alignment with a socket 74 provided in the top surface of the mounting block 46. A pin 75 may be inserted through the aligned hole 72 and engaged in the socket 74 to hold the housing 29 and draw bar 34 in the brake unlocked position shown. This locking of the brake control mechanism in ineffective position may be required as, for example, when it is desired to back the trailing vehicle 12 or to permit manual positioning of the trailing vehicle after it has been uncoupled from the lead vehicle. When it is desired to lock the mechanism with the brakes set, the housing 29 is moved rearwardly relative to the piston 35. The pin 75 then is inserted through the hole 73 and engaged in the socket 74 which will then be in vertical alignment therewith.

Although an exemplary form the present invention has been disclosed in detail in the accompanying drawings and described in detail in the foregoing specification, it should be understood that the invention is capable of embodying a wide variety of modifications in detail structure and that said mechanism is readily adaptable for installation in trailing vehicles constructed other than as illustrated without departing from the spirit of the invention or the scope of the appended claims.

I claim:

1. A combined coupler and brake actuating mechanism comprising a cylinder, a draw bar integral with the cylinder adapted to be attached to a towing vehicle, a piston in said cylinder, means permitting controlled circulation of fluid around said piston, a piston rod on said piston adapted to be connected to a trailing vehicle, said piston rod having a passageway therein adapted to communicate with the trailing vehicle brakes, said piston being movable in one direction to create fluid pressure in the passageway for operating the trailing vehicle brakes, and a pop-valve in the piston operative to relieve said pressure when the piston moves in the opposite direction.

2. A combined coupler and brake actuating mechanism comprising a cylinder, fluid in said cylinder, a slidable mounting for said cylinder adapted to be attached to a trailing vehicle, a draw-bar integral with the cylinder adapted to be attached to a towing vehicle, a piston operable in the cylinder having a passageway therethrough and through a piston rod connected thereto, said piston rod being adapted to be secured to the trailing vehicle, a spring between said piston and one end of the cylinder to normally urge the other end of the cylinder toward the piston to place fluid in said other cylinder end and passageway under pressure, and means operable to relieve said pressure upon initial movement of the cylinder in the opposite direction.

3. A combined coupler and brake actuating mechanism comprising a cylinder, fluid in said cylinder, a fluid reservoir associated with the cylinder, a slideable mounting on said cylinder adapted to be attached to a trailing vehicle, a draw-bar integral with the cylinder adapted to be attached to a towing vehicle, a piston operable in the cylinder having a passageway therethrough and through a piston rod connected thereto, said piston being adapted to be attached to the trailing vehicle, a relatively large port connecting the reservoir with the cylinder adjacent the end, through the end of which the piston rod extends, and a plurality of small ports connecting the reservoir with the other end of the cylinder.

4. A combined coupler and brake actuating mechanism comprising, a cylinder adapted to be attached to a towing vehicle, a piston operable in the cylinder, said piston being adapted to be attached to the trailing vehicle, a fluid reservoir, said reservoir having a free-flowing port communicating with the cylinder on one side of the piston, and a plurality of flow restriction ports communicating with the cylinder on the other side of the piston, said restriction ports being spaced longitudinally along the cylinder so as to be successively closed during movement of the piston thereover in one direction, and a relief valve in the piston to admit fluid from one cylinder end into the other cylinder end upon initial movement of the piston in the other direction.

5. A combined coupler and brake actuating mechanism comprising, a cylinder adapted to be attached to a towing vehicle, a piston operable in the cylinder, said piston being adapted to be attached to a trailing vehicle, a rod on the piston extending through one end of the cylinder, said piston and rod having a continuous passage therethrough, a fluid reservoir, said reservoir having a free-flowing port communicating with the cylinder on one side of the piston and a plurality of flow restriction ports communicating with the cylinder on the other side of the piston, said restriction ports being spaced longitudinally along the cylinder so as to be successively closed during the movement of the piston thereover in one direction so as to place fluid in the related cylinder end and in the passage under pressure.

6. A combined coupler and brake actuating mechanism comprising a cylinder adapted to be attached to a towing vehicle, a piston operable in said cylinder, said piston being adapted to be attached to a trailing vehicle having a brake system therein, a rod on the piston extending through one end of the cylinder, said piston and rod having a continuous passage therethrough, means connecting said passage with the brake system of the trailing vehicle, a fluid reservoir, said reservoir having a free-flowing port communicating with the cylinder on one side of the piston, and a plurality of flow restriction ports communicating with the cylinder on the other side of the piston, said restriction ports being spaced longitudinally along the cylinder so as to be successively closed during the movement of the piston thereover in one direction so as to place fluid in the related cylinder end and in the brake system under pressure.

7. A combined coupler and brake actuating mechanism comprising, a cylinder adapted to be attached to a towing vehicle, a piston operable in the cylinder, said piston being adapted to be attached to a trailing vehicle, a rod on the piston extending through one end of the cylinder, said piston and rod having a continuous passage therethrough, a fluid reservoir, said reservoir having a free-flowing port communicating with the cylinder on one side of the piston and a plurality of flow restriction ports communicating with the cylinder on the other side of the piston, said restriction ports being spaced longitudinally along the cylinder so as to be successively closed during the movement of the piston thereover in one direction so as to place fluid in the related cylinder end and in the passage under perssure, and a relief valve in the piston to admit fluid from one cylinder end into the other cylinder end upon initial movement of the piston in the other direction.

8. A combined coupler and brake actuating mechanism comprising a cylinder adapted to be attached to a towing vehicle, a piston operable in the cylinder, said piston being adapted to be attached to a trailing vehicle having a brake system therein, a rod on the piston extending through one end of the cylinder, said piston and rod having a continuous passage therethrough, means connecting said passage with the brake system of the trailing vehicle, a fluid reservoir, said reservoir having a free-flowing port communicating with the cylinder on one side of the piston and a plurality of flow restriction ports communicating with the cylinder on the other side of the piston, said restriction ports being spaced longitudinally along the cylinder so as to be successively closed during the movement of the piston thereover in one direction so as to place fluid in the related cylinder end and in the brake system under pressure, and a relief valve in the piston adapted to open when the piston moves in the other direction to place the cylinder ends in direct communication with each other to relieve the pressure in the brake system.

9. A combined coupler and brake actuating mechanism comprising a cylinder, a draw-bar integral with the cylinder adapted to be attached to a towing vehicle, a piston including a piston rod movable relative to the cylinder, said piston being adapted to be attached to a trailing vehicle having a brake system therein, the piston and piston rod having a passageway therethrough communicating at one end with one end of the cylinder and at its other end with the brake system of the trailing vehicle, a chamber on said cylinder, said chamber, cylinder and passageway being adapted to contain fluid, a port connecting the chamber with one end of the cylinder, and a series of ports connecting said chamber with the other cylinder end, said series of ports being adapted to be closed successively when the piston moves in one direction relative to the cylinder.

10. A combined coupler and brake actuating mechanism comprising a cylinder, a draw-bar integral with the cylinder adapted to be attached to a towing vehicle, a piston including a piston rod movable relative to the cylinder, said piston being adapted to be attached to a trailing vehicle having a brake system therein, said piston and piston rod having a passage therethrough communicating at one end with one end of the cylinder and at its other end with the trailing vehicle brake system, a chamber on said cylinder, said chamber, cylinder and passage being adapted to contain fluid, a port connecting the chamber with one end of the cylinder, a series of ports connecting said chamber with the other cylinder end, said series of ports being adapted to be closed successively when the piston moves in one direction relative to the cylinder, and a spring-controlled normally closed by-pass valve in the piston to enable fluid to pass from one cylinder end to the other when the piston is moved in the other direction.

References Cited in the file of this patent

UNITED STATES PATENTS

| Number | Name | Date |
|---|---|---|
| 618,294 | Sammis | Jan. 24, 1899 |
| 2,104,576 | Zagelmeyer | Jan. 4, 1938 |
| 2,149,189 | Shaffer | Feb. 28, 1939 |
| 2,158,175 | Coppola et al. | May 16, 1939 |
| 2,162,029 | Paul | June 13, 1939 |
| 2,332,301 | Cox | Oct. 19, 1943 |
| 2,397,001 | Goodwin | Mar. 19, 1946 |
| 2,407,156 | Horne | Sept. 3, 1946 |
| 2,527,034 | Rossman | Oct. 24, 1950 |
| 2,571,323 | Yoder | Oct. 16, 1951 |